US008860317B2

(12) United States Patent
Park et al.

(10) Patent No.: US 8,860,317 B2
(45) Date of Patent: Oct. 14, 2014

(54) MULTI POWER SUPPLY APPARATUS FOR DRIVING LIGHT EMITTING DIODES

(75) Inventors: Sang Gab Park, Gyunggi-do (KR); Heung Gyoon Choi, Gyunggi-do (KR); Nam Jin Park, Gyunggi-do (KR); Tae Shik Kim, Gyunggi-do (KR); Tae Hyung Kang, Gyunngi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 928 days.

(21) Appl. No.: 13/017,695

(22) Filed: Jan. 31, 2011

(65) Prior Publication Data

US 2011/0260631 A1   Oct. 27, 2011

(30) Foreign Application Priority Data

Apr. 22, 2010 (KR) .................. 10-2010-0037520

(51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01)
USPC ............................. 315/165; 315/220; 315/307

(58) Field of Classification Search
USPC .......... 315/165, 161, 219, 220, 226, 297, 307
See application file for complete search history.

(56) References Cited

U.S. PATENT DOCUMENTS

| | | | |
|---|---|---|---|
| 6,369,525 B1 * | 4/2002 | Chang et al. | 315/300 |
| 6,888,529 B2 * | 5/2005 | Bruning et al. | 345/102 |
| 2009/0279332 A1 | 11/2009 | Grant et al. | |
| 2012/0299483 A1 * | 11/2012 | Lethellier | 315/121 |

FOREIGN PATENT DOCUMENTS

| | | |
|---|---|---|
| CN | 101345491 | 1/2009 |
| CN | 101383559 | 3/2009 |
| CN | 101489335 | 7/2009 |
| CN | 101621884 | 1/2010 |
| JP | 2005026431 | 1/2005 |
| JP | 2009266777 A | 11/2009 |

OTHER PUBLICATIONS

Office Action dated Dec. 9, 2013 in corresponding Chinese Patent Application No. 201110037588.4, 15 pages.
Office Action mailed May 24, 2013 for Chinese application No. 201110037588.4.

* cited by examiner

*Primary Examiner* — Daniel D Chang
(74) *Attorney, Agent, or Firm* — Lowe Hauptman & Ham, LLP

(57) ABSTRACT

There is provided a multi power supply apparatus for driving light emitting diodes that is synchronized with a frequency of one output power of multi output power to control a switching of the multi output power and simplifies power conversion in supplying power for driving light emitting diodes. The multi power supply apparatus for driving light emitting diodes includes a power converter that converts an input power into a first power according to a preset first conversion scheme and converts the input power into a second power according to a second conversion scheme set to be different from the first conversion scheme; first and second drivers that receive the first power and the second power from the power converter to drive light emitting diodes; a feedback unit that feedbacks detection signal from the first and second LED drivers; and a power conversion controller that controls a power conversion switching frequency of the first power of the power converter according to the detection signal from the feedback unit and is synchronized with the power conversion switching frequency to control a duty of the second power of the converter.

44 Claims, 7 Drawing Sheets

MULTI POWER SUPPLY APPARATUS FOR DRIVING LIGHT EMITTING DIODES

CROSS-REFERENCE TO RELATED APPLICATIONS

This application claims the priority of Korean Patent Application No. 10-2010-0037520 filed on Apr. 22, 2010, in the Korean Intellectual Property Office, the disclosure of which is incorporated herein by reference.

BACKGROUND OF THE INVENTION

1. Field of the Invention

The present invention relates to a multi power supply apparatus, and more particularly, to a multi power supply apparatus for driving light emitting diodes that is synchronized with a frequency of one output power of multi output power to control a switching of the multi output power and simplifies power conversion in supplying power for driving light emitting diodes.

2. Description of the Related Art

A power supply apparatus has so far been commonly used in information technology equipment such as a personal computer or the like, and home appliances such as an air conditioner, a stereo, a television or the like.

Such a power supply apparatus may supply a plurality of output powers depending on the electronic products to which the power supply apparatus is applied.

A general multi power supply apparatus converts an input DC power into separate AC powers through a single transformer and rectifies them again, thereby outputting a plurality of DC power. However, the general multi power supply apparatus affects other DC powers when the voltage level of one of the plurality of DC powers is changed by the single transformer, such that cross-regulation is not maintained. To this end, a buck chopper circuit is provided to an output terminal. However, power is reconverted by the buck chopper circuit after a primary power conversion, thereby degrading power conversion efficiency. Further, the number of components is increased due to the buck chopper circuit, such that manufacturing costs rise.

In addition, when a power supply apparatus is adopted for driving light emitting diodes, a boost circuit or a buck circuit is adopted so as to compensate for voltage deviation between light emitting diodes after the primary power conversion, thereby degrading power conversion efficiency. Further, the number of components is increased due to the boost circuit or the buck circuit, such that manufacturing costs rise.

SUMMARY OF THE INVENTION

An aspect of the present invention provides a multi power supply apparatus for driving light emitting diodes that is synchronized with a frequency of one output power of multi output power to control a switching of the multi output power and simplifies power conversion in supplying power for driving light emitting diodes.

According to an aspect of the present invention, there is provided a multi power supply apparatus for driving light emitting diodes, including: a power converter that converts an input power into a first power according to a preset first conversion scheme and converts the input power into a second power according to a second conversion scheme set to be different from the first conversion scheme; a first driver that receives the first power from the power converter to perform a preset first operation; a second driver that receives the second power from the power converter to perform a preset second operation; a feedback unit that has a first feedback unit feedbacking a detection signal from the first driver and a second feedback unit feedbacking a detection signal from the second driver; and a power conversion controller that controls a power conversion switching frequency of the first power of the power converter according to the detection signal from the feedback unit and is synchronized with the power conversion switching frequency to control a duty of the second power of the converter, wherein the first driver is a first LED driver that receives the first power to drive light emitting diodes.

The second driver may be a second LED driver that receives the second power to drive light emitting diodes.

The first feedback unit may be a first photo coupler that transfers a first detection signal detecting a current level flowing through the light emitting diodes from the first LED driver to the power conversion controller.

The second feedback unit may be a second photo coupler that transfers a second detection signal detecting a current level flowing through the light emitting diodes from the second LED driver to the power conversion controller.

The second feedback unit may be a second photo coupler that transfers a second detection signal detecting a voltage level of the second power supplied to the second driver to the power conversion controller.

The power conversion controller may constant-current control the first power and the second power.

The power conversion controller may constant-current control the first power and constant-voltage control the second power.

The power conversion controller may include: a frequency controller that controls a resonant frequency according to comparison results between a voltage level of the first detection signal and a preset voltage level of a first reference voltage; a saw-tooth wave generator that generates a saw-tooth wave according to the resonant frequency from the frequency controller; a duty controller that compares an error between a voltage level of the second detection signal and a preset voltage level of a second reference voltage and the saw-tooth wave from the saw-tooth wave generator to control a switching duty of a power conversion circuit; and a switching controller that provides first and second switching signals controlling an alternate switching of the power conversion circuit according to a switching duty control of the duty controller.

The frequency controller may include: a first error amplifier that compares the voltage level of the first detection signal and the preset voltage level of the first reference voltage to amplify the comparison results according to a preset amplification factor; a first resistor that sets the amplification factor of the first error amplifier according to a preset resistance value; and a frequency setting device that sets the resonant frequency according to the comparison results amplified by the first error amplifier.

The duty controller may include: a second error amplifier that compares the voltage level of the second detection signal and the preset voltage level of the second reference voltage to amplify the comparison results according to a preset amplification factor; a second resistor that sets the amplification factor of the second error amplifier according to a preset resistance value; a comparator that compares the comparison results amplified by the second error amplifier and the voltage level of the saw-tooth wave from the saw-tooth wave generator; and a duty setting device that sets a switching duty of the power converter according to comparison results from the comparator.

The converter may include: a switching unit that includes first and second switches alternately switching according to the control of the power conversion controller; a converter that converts each of the powers switched from the switching unit into a power having a voltage level determined according to a preset turn ratio; and first and second rectifiers that rectify each of the powers converted from the converter to output the first power and the second power.

The converter may be an LLC resonant converter that includes a resonant capacitor and a resonant inductor connected to power input terminals of the first and second switches in series, and a magnetic inductor connected to the first and second switches in parallel.

The converter may include: a switching unit that includes first and second switches alternately switching according to the control of the power conversion controller; first and a second converters that convert each of the powers switched from the switching unit into a power having a voltage level determined according to a preset turn ratio; and first and second rectifiers that rectify each of the powers converted from the first and second converters to output the first power and the second power.

The first and second converters may be an LLC resonant converter that includes a resonant capacitor and a resonant inductor each connected to power input terminals of the first and second switches in series, and a magnetic inductor connected to the first and second switches in parallel.

The first LED driver may include: a first LED unit that receives the first power to emit light; a first switching unit that supplies or blocks current to the LED unit; a first detector that detects current flowing through the LED unit; a first controller that controls a switching of the first switching unit according to the detected value of the first detector; and a first compensator that compensates for a level of the detected results from the first controller to transfer the level to the feedback unit.

The second LED driver may include: a second LED unit that receives the second power to emit light; a second switching unit that supplies or blocks current to the LED unit; a second detector that detects current flowing through the LED unit; a second controller that controls a switching of the second switching unit according to the detected value of the second detector; and a second compensator that compensates for a level of the detected results from the second controller to transfer the level to the feedback unit.

The first LED unit and the second LED unit may each include at least one light emitting diode, at least one column of light emitting diodes in which a plurality of light emitting diodes are connected in series, or a plurality of columns of light emitting diodes each connected in parallel.

The first switching unit and the second switching unit may each include at least one switch electrically connected to the at least one light emitting diode or the at least one column of light emitting diodes of the first and second LED units in series, or a plurality of switches each electrically connected to the plurality of columns of light emitting diodes of the first and second LED units in series.

The first detector and the second detector may each include at least one resistor electrically connected to at least one switch of the first and second switching units in series or a plurality of resistors each electrically connected to a plurality of switches of the first and second switching units in series.

The first controller and the second controller may each transfer one having the lowest level of each detected value from the plurality of resistors of the first detector to the feedback unit.

The multi power supply apparatus for driving light emitting diodes may further include: a filter that removes electromagnetic interference of common AC power; a rectifier that rectifies power filtered by the filter; and a power factor corrector that corrects a power factor of the power rectified by the rectifier to transfer it to the power converter as the input power.

According to another aspect of the present invention, there is provided a multi power supply apparatus for driving light emitting diodes, including: a power converter that converts an input power into a first power according to a preset first conversion scheme and converts the input power into a second power according to a second conversion scheme set to be different from the first conversion scheme; a first driver that receives the first power from the power converter to perform a preset first operation; a second driver that receives the second power from the power converter to perform a preset second operation; a feedback unit that has a first feedback unit feedbacking a detection signal from the first driver and a second feedback unit feedbacking a detection signal from the second driver; and a power conversion controller that controls a power conversion switching frequency of the first power of the power converter according to the detection signal from the feedback unit and is synchronized with the power conversion switching frequency to control a duty of the second power of the converter, wherein the second driver is a second LED driver that receives the second power to drive light emitting diodes.

According to another aspect of the present invention, there is provided a multi power supply apparatus for driving light emitting diodes, including: a power converter that converts an input power into a first power according to a preset first conversion scheme and converts the input power into a second power according to a second conversion scheme set to be different from the first conversion scheme; a first driver that receives the first power from the power converter to perform a preset first operation; a second driver that receives the second power from the power converter to perform a preset second operation; a feedback unit that has a first feedback unit feedbacking a detection signal from the first driver and a second feedback unit feedbacking a detection signal from the second driver; and a power conversion controller that controls a power conversion switching frequency of the first power of the power converter according to the detection signal from the feedback unit and is synchronized with the power conversion switching frequency to control a duty of the second power of the converter, wherein the first driver is a first LED driver that receives the first power to drive light emitting diodes and the second driver is a second LED driver that receives the second power to drive light emitting diodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
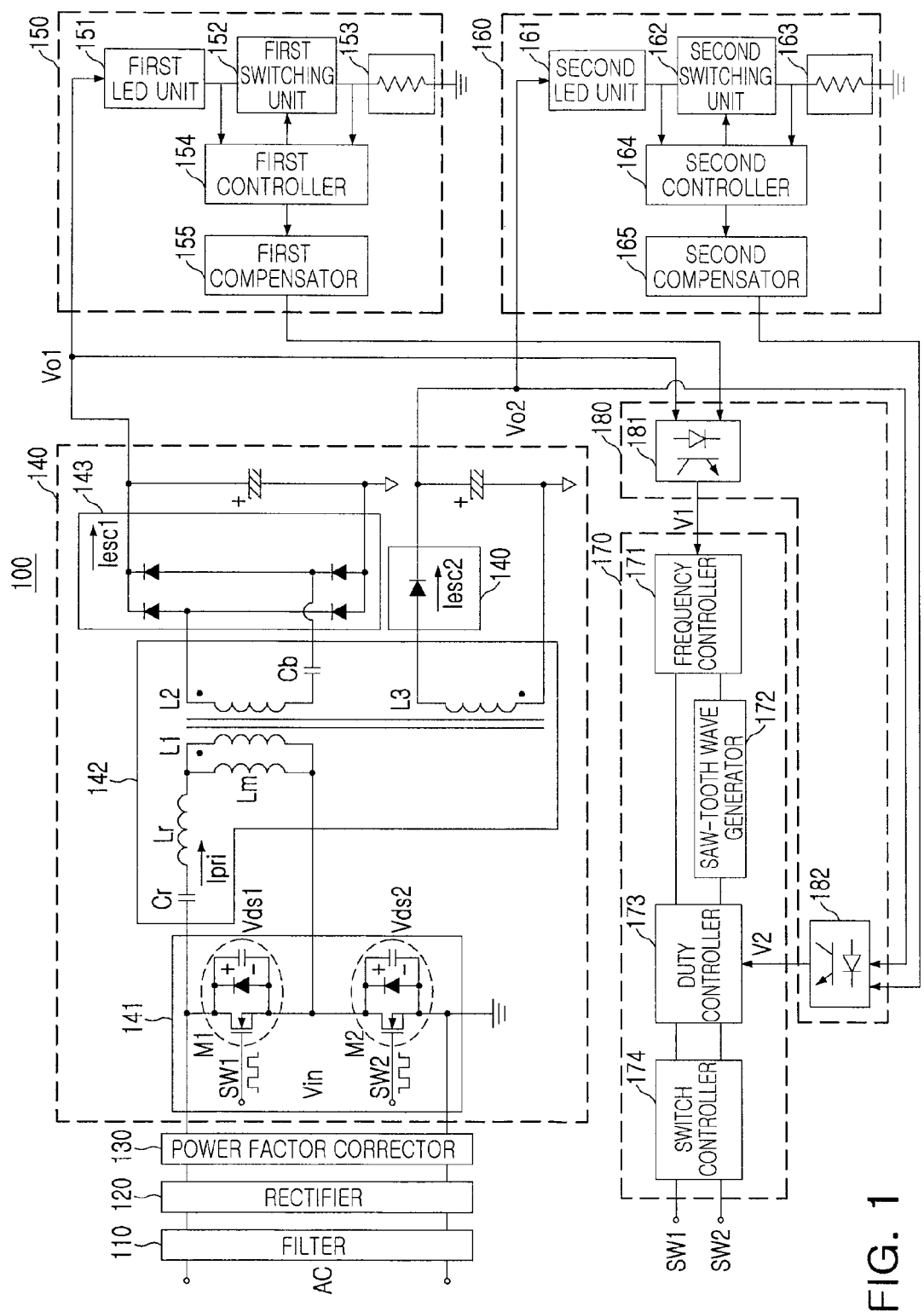
FIG. 1 is a schematic configuration diagram of a multi power supply apparatus for driving light emitting diodes according to a first embodiment of the present invention.

FIG. 1 is a schematic configuration diagram of a multi power supply apparatus for driving light emitting diodes according to a first embodiment of the present invention.

Referring to FIG. 1, a multi power supply apparatus 100 for driving light emitting diodes according to a first embodiment of the present invention may include a filter 110 that removes electromagnetic interference (EMI) included in a common AC power, a rectifier 120 that rectifies power filtered by the filter 110, a power factor corrector 130 that corrects a power factor by compensating for a phase difference between the current and the voltage of the power rectified by the rectifier 120, a power converter 140, first and second LED drivers 150 and 160, a power conversion controller 170, and a feedback unit 180.

The power converter 140 may include a switching unit 141, a converter 142, and first and second rectifiers 143 and 144.

The switching unit 141 may include first and second switches M1 and M2 that are electrically connected to each other in series and are connected to an input DC power terminal in parallel to be alternately switched according to switching signals sw1 and sw2 from the power conversion controller 170. The AC power switched by the switching unit 141 is transferred to the converter 142, respectively.

The converter 142 may be a LLC resonant converter that includes a resonant capacitor Cr and a resonant inductor Lr connected in series, and a magnetic inductor Lm connected to each of the first and second switches M1 and M2 in parallel. In addition, the converter 142 may include a single transformer that has a primary winding L1 and secondary windings L2 and L3 having a preset turn ratio. The magnetic inductor Lm may be configured of only leakage inductance of the transformer. In this case, the secondary windings L2 and L3 of the converter 142 may each output independent power.

The AC power switched by the switching unit 141 is converted into an AC power having a voltage level according to the preset turn ratio of the converter 142, thereby being transferred to the first and second rectifiers 143 and 144.

The first and second rectifiers 143 and 144 rectify the AC power from the converter 142 to output first and second power Vo1 and Vo2. In this case, rectifying elements of the first and second rectifiers 143 and 144 are configured of at least one diode d5, thereby making it possible to half-wave rectify the AC power. Alternatively, rectifying elements of the first and second rectifiers 143 and 144 are configured of a bridge diode made of a plurality of diodes d1 to d4, thereby making it possible to full-wave rectify the AC power The first and second power Vo1 and Vo2 from the first and second rectifiers 143 and 144 may be transferred to the first and second LED drivers 150 and 160.

The first and second LED drivers 150 and 160 may each include first and second LED units 151 and 161, first and second switching units 152 and 162, first and second detectors 153 and 163, first and second controllers 154 and 164, and first and second correctors 155 and 165.

As an example, in the case of the first LED driver 150, the first power Vo1 is directly transferred to the first LED unit 151 having at least one light emitting diode without a separate boost circuit or buck circuit. The first switching unit 152 is connected to the first LED unit 151 in series, thereby making it possible to switch so that current is supplied or blocked to the first LED unit 151. A first detector 153 having at least one resistor may be connected in series between the first switching unit 152 and a ground. A detected value detected by the first detector 153 is transferred to the first controller 154. The first controller 154 may receive the detected value and control the first switching unit 152 to be switched-on/off. Therefore, the first controller 154 may perform dimming control by controlling the supply of current flowing through the first LED unit 151. The first controller 154 may transfer the detected value transferred to the power conversion controller 170 through the feedback unit 180. In addition, the first controller 154 may further detect a drain voltage of the first switching unit 152 in order to detect an abnormal operation or not. The first corrector 155 may compensate for a level of the detected value from the controller 154 to transfer it to the feedback unit 180.

The second LED driver 160 operates in the same manner as the first LED driver 150, such that a detailed description thereof will be omitted.

The feedback unit 180 may include a first photo coupler 181 and a second photo coupler 182, wherein the first photo coupler 181 may receive detection results from the first LED driver 150. In addition, the first photo coupler 181 may also receive a state value of the first power Vo1 transferred to the first LED driver 150 in order to prevent malfunction.

Likewise, the second photo coupler 182 may also receive detection results from the second LED driver 160 and a state value of the second power Vo2.

The power conversion controller 170 may control the power conversion operation of the power converter 140 based on the detection signals from the feedback unit 180.

The power conversion controller 170 may control the power conversion operation of the power converter 140 so that the first and second power Vo1 and Vo2 are constant-current controlled according to the detection signals of the feedback unit 180.

The power conversion controller 170 includes a frequency controller 171 that receives a first detection signal from the first photo coupler 181 of the feedback unit 180, a saw-tooth wave generator 172, a duty controller 173 that receives a first detection signal from the second photo coupler 182 of the feedback unit 180, and a switching controller 174. The detailed constitution of the power conversion controller 170 will be described with reference to FIG. 2.

Figure 2:
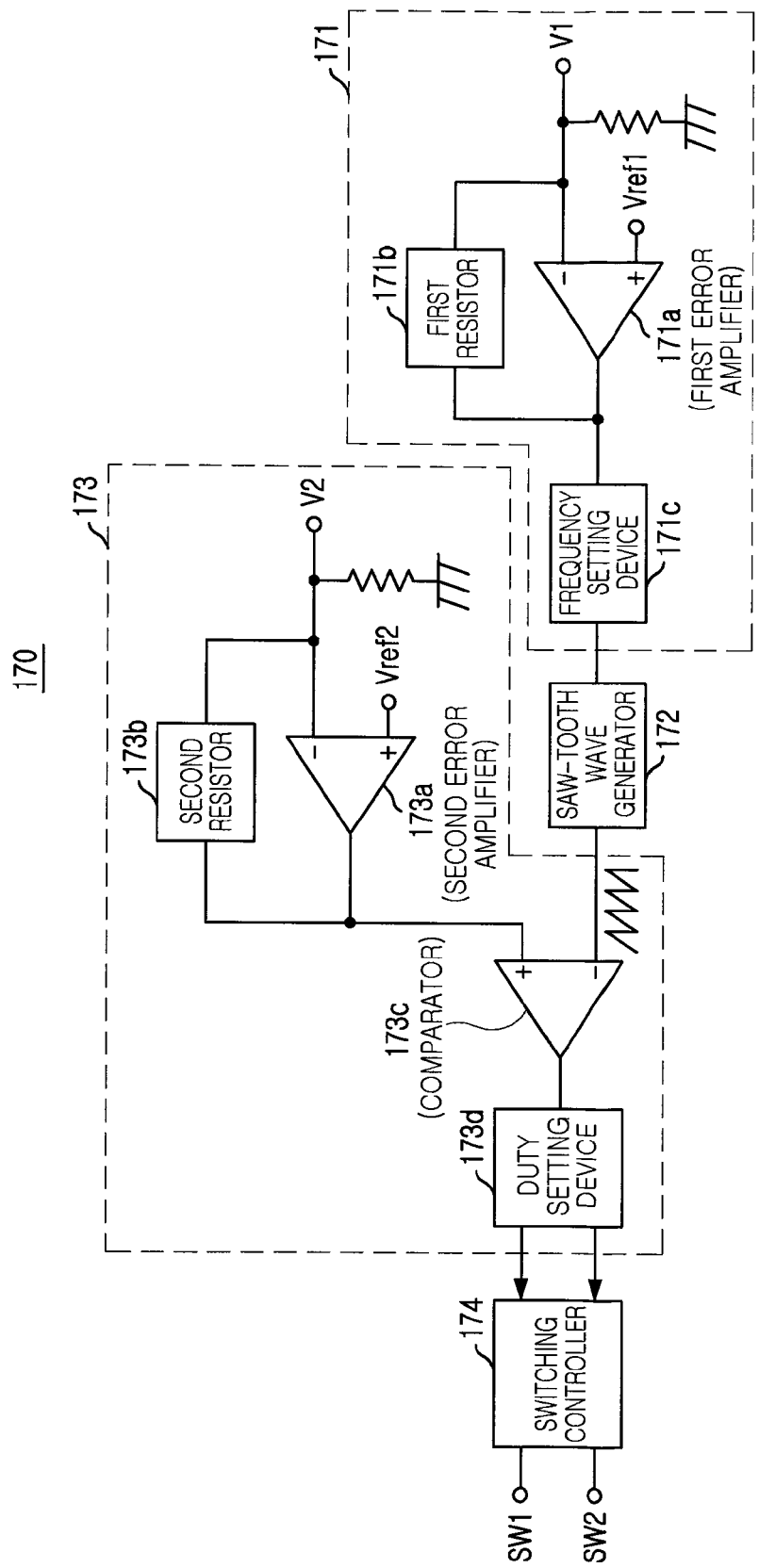
FIG. 2 is an schematic internal configuration diagram of a power conversion controller provided to a multi power supply apparatus for driving light emitting diodes according to the present invention.

FIG. 2 is a schematic internal configuration diagram of a power conversion controller provided to a multi power supply apparatus for driving light emitting diodes according to the present invention.

The frequency controller 171 of the power conversion controller 170 includes a first error amplifier 171a that amplifies an error between a voltage level of the first detection signal from the first photo coupler 181 and a preset voltage level of a first reference voltage Vref1, a first resistor 171b that sets an error amplification factor of the first error amplifier 171a according to the preset resistance value, and a frequency setting device 171c that sets frequency according to comparison results of the first error amplifier 171a. The frequency signal from the frequency setting device 171c is transferred to the saw-tooth wave generator 172.

The saw-tooth wave generator 172 generates a saw-tooth wave synchronized with the frequency signal from the frequency setting device 171c. The saw-tooth wave is transferred to the duty controller 173.

The duty controller 173 includes a second error amplifier 173a that amplifies an error between a voltage level of a second detection signal of the second photo coupler 182 and a voltage level of a preset second reference voltage Vref2, a second resistor 173b that sets an error amplification rate of the second error amplifier 173a according to a preset resistance value, a comparator 173c that compares a voltage level of the comparison results of the second error amplifier 173a and a voltage level of the saw-tooth wave from the saw-tooth wave generator 172, and a duty setting device 173d that sets a switching duty according to the comparison results of the comparator 223. The duty signals from the duty setting device 173d are transferred to the switching controller 174.

The switching controller 174 transfers the first and second switching signals sw1 and sw2 that control the switching of first and second switches M1 and M2 to the switching unit 141 according to the duty signals from the duty setting device 173d.

Figure 3:
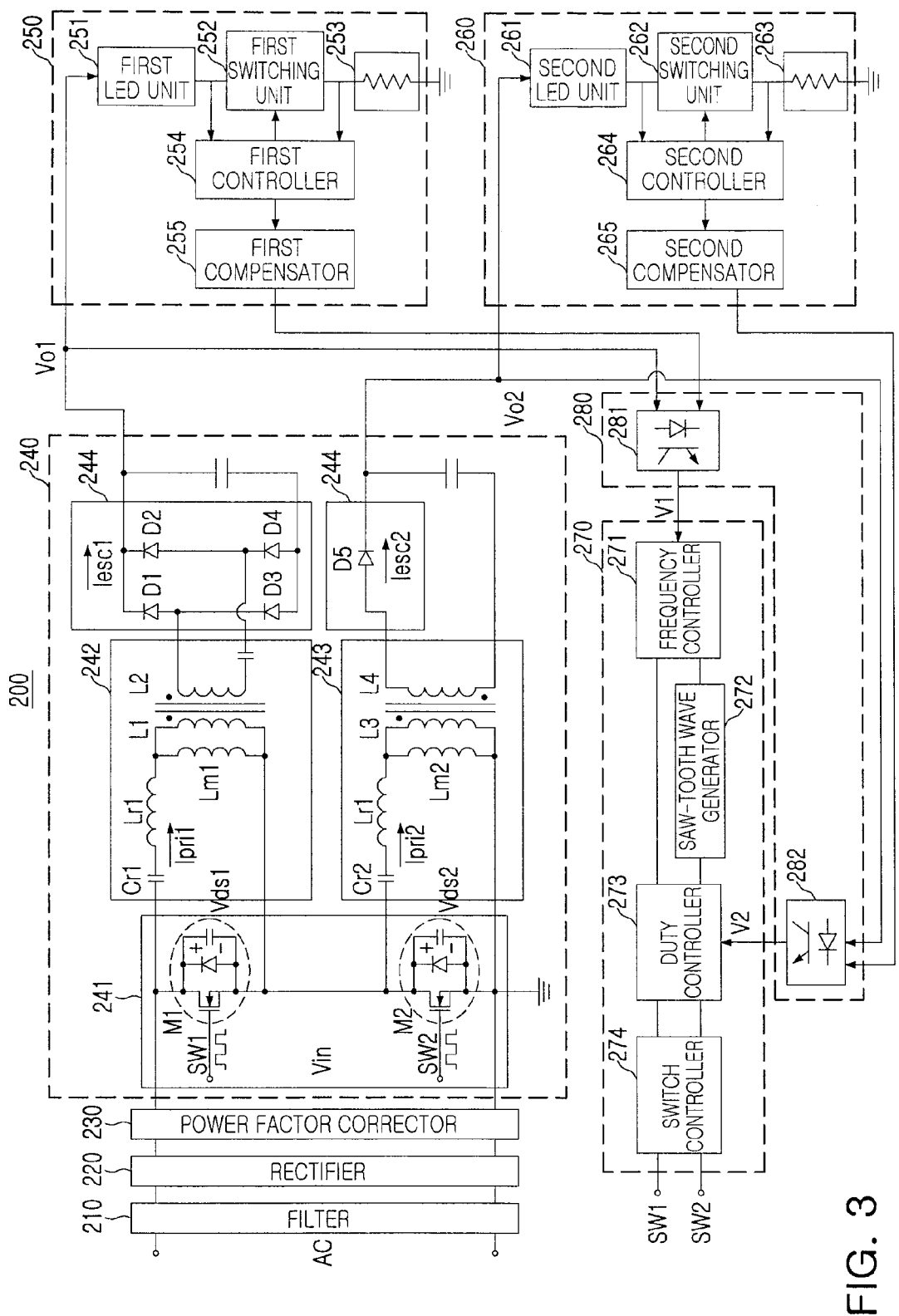
FIG. 3 is a schematic configuration diagram of a multi power supply apparatus for driving light emitting diodes according to a second embodiment of the present invention.

FIG. 3 is a schematic configuration diagram of a multi power supply apparatus for driving light emitting diodes according to a second embodiment the present invention.

A power supply apparatus 200 for driving light emitting diodes according to a second embodiment of the present invention in FIG. 3 has the same configurations as those of the power supply apparatus 100 for driving light emitting diodes according to a first embodiment of the present invention in FIG. 1, except for a power converter 240. Therefore, the schematic internal configurations of a filter 210, a rectifier 220, a power factor corrector 230, first and second LED drivers 250 and 260, a power conversion controller 270, and a feedback unit 280 and a detailed description thereof will be omitted.

A switching unit 241 of the power converter 240 transfers power switched by an alternate switching of the first and second switches M1 and M2 to each of the first and second converters 242 and 243. The first and second converters 242 and 243 may be an LLC resonant converter that includes resonant capacitors Cr1 and Cr2 and resonant inductors Lr1 and Lr2 each connected in series and magnetic inductors Lm1 and Lm2 each connected to the first and second switches M1 and M2 in parallel. In addition, the first and second converters 242 and 243 may include two transformers that have primary windings L1 and L3 and secondary windings L2 and L4 having a preset turn ratio. The magnetic inductors Lm1 and Lm2 may be configured of only leakage inductance of the transformer.

The AC power switched by the switching unit 241 is separately converted into AC power of the first and second converters 242 and 243, having a voltage level according to the preset turn ratio, to be transferred to first and second rectifiers 244 and 245.

The first and second rectifiers 244 and 245 each rectify the AC power from the first and second converters 242 and 243 to output first and second power Vo1 and Vo2. In this case, rectifying elements of the first and second rectifiers 244 and 245 are configured of at least one diode d5, thereby making it possible to half-wave rectify the AC power. Alternatively, rectifying elements of the first and second rectifiers 244 and 245 are configured of a bridge diode made of a plurality of diodes d1 to d4, thereby making it possible to full-wave rectify the AC power The first and second power Vo1 and Vo2 from the first and second rectifiers 244 and 245 may be transferred to the first and second LED drivers 250 and 260.

Figure 4:
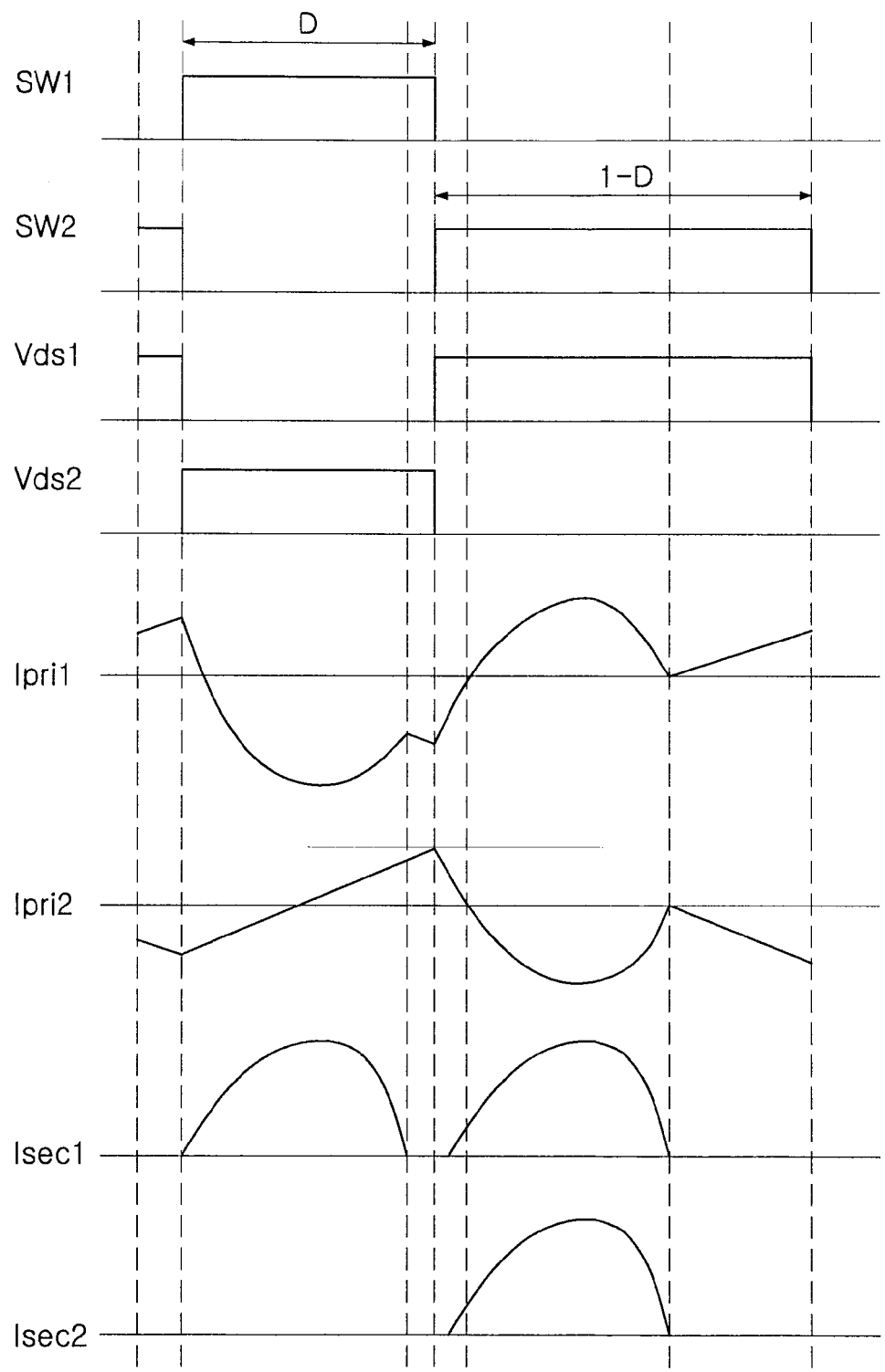
FIG. 4 is a signal waveform diagram of a main portion of a multi power supply apparatus for driving light emitting diodes according to the present invention.

FIG. 4 is a signal waveform diagram of a main portion of a multi power supply apparatus for driving light emitting diodes according to the present invention.

The operation of the multi power supply apparatus for driving light emitting diodes according to the present invention will be described in detail with reference to FIGS. 2 and 4. The present invention has been described based on the multi power supply apparatus for driving light emitting diodes according to the second embodiment of the present invention as shown in FIG. 3. However, the configuration of the multi power supply apparatus for driving light emitting diodes in FIG. 3 is the same as that of the multi power supply apparatus for driving light emitting diodes in FIG. 4, except for the difference in embodiments as to whether the power convert is configured of a single transformer or two transformers, that is, current Ipri2 introduced into the primary winding L3 of the second converter 243. Therefore, the present invention will be described based on the multi power supply apparatus for driving light emitting diodes according to the second embodiment of the present invention.

First, the first and second switches M1 and M2 are alternately switched according to the switching of the power conversion controller 270 to operate at the duty of D and 1−D, respectively. Therefore, each voltage Vds1 and Vds2 is applied to the first and second switches M1 and M2 at the time of switching off.

The charging voltage of the first resonant capacitor Cr1 is controlled by the alternate on/off switching of the first and second switches M1 and M2 to control the voltage applied to the primary winding L1 of the first converter 242, such that the first power Vo1 is formed through the secondary winding L2 of the first converter 242 and the diodes d1 and d4, or d2 and d3 of the first rectifier 244.

In this case, the first power Vo1 is minutely formed through the frequency controller 271 that modulates a switching frequency.

In addition, the charging voltage of the second resonant capacitor Cr2 is controlled by the alternate on/off switching of the first and second switches M1 and M2 to control the voltage applied to the primary winding L3 of the second converter 243, such that the second power Vo2 is formed through the secondary winding L4 of the second converter 243 and the diode d5 of the second rectifier 245.

The multi output DC/DC converter according to the present invention includes the frequency controller 271 that controls the output voltage based on the first detection signal and a duty controller 273 that controls the output voltage based on the second detection signal.

In this case, the duty controller 273 that modulates a pulse width is synchronized with the switching frequency of the frequency controller 271 that is converted based on the first power Vo1, such that the switching frequency and the pulse width are simultaneously modulated.

Next, the frequency controller 271 of the power conversion controller 270 compares the voltage level of the first detection signal of the first photo coupler 281 and the preset voltage level of the first reference voltage Vref1 through the first error amplifier 171a and transfers the frequency signal having a frequency varied according to the comparison results to the saw-tooth wave generator 272 through the frequency setting device 171c.

The saw-tooth wave generator 272 forms a saw-tooth wave that is synchronized with the varied frequency of the frequency signal. The duty controller 273 compares the voltage level of the second detection signal of the second photo coupler 282 and the preset voltage level of the second reference voltage Vref2 through the second error amplifier 173a and compares the error results from the second error amplifier 173a and the saw-tooth wave from the saw-tooth wave generator 272 through the comparator 173c to form a duty signal through the duty setting device 173d and then transfer the duty signal to the switching controller 274. The switching controller 274 transfers the first and second switching signals sw1 and sw2 to the switching unit 241 according to the duty signal to control the switching of the first and second switches M1 and M2.

More specifically, the charging voltage of the first resonant capacitor Cr1 is controlled by the alternate on/off switching of the first and second switches M1 and M2 of the switching unit 241 to control the voltage applied to the primary winding L1 of the first converter 242, such that the first power Vo1 is formed through the secondary winding L2 of the first converter 242 and the diodes d1 and d4, or d2 and d3 of the first rectifier 244.

In this case, in order to increase the voltage level of the first power Vo1, the switching frequency is controlled to be low through the frequency controller 271 that modulates the switching frequency. In view of the characteristics of the LLC resonant scheme, if the switching frequency is lowered, voltage gain is increased. Therefore, the voltage level of the first power Vo1 output from the first converter 242 is increased.

In this configuration, when there is an asymmetry in the duty generated based on the second power Vo2, a dc blocking capacitor Cb of the first rectifier 244 is inserted in order to prevent a phenomenon in which the resonant current generated from the first converter 242 passes through the path of only the diodes d1 and d4, or d2 and d3 of the first rectifier 244. In other words, the half-wave rectifying operation is limited by the asymmetrical operation of the duty.

Meanwhile, in the case that the voltage level of the second power Vo2 fluctuates as the load of the second power Vo2 is varied, the duty on period of the switch directly related to the second power Vo2 is controlled. In this case, the operation duty D directly related to the second power Vo2 is applied to the first switch M1. When the voltage level of the second power Vo2 is increased, the operation duty D is decreased due to the control in modulation of the pulse width, however, the switching frequency is not fluctuated thereby. Therefore, even though the operation duty D is controlled in order to control the voltage level of the second power Vo2, the voltage level of the first power Vo1 is not fluctuated. In other words, the first power Vo1 and the second power Vo2 are independently controlled.

Figure 5:
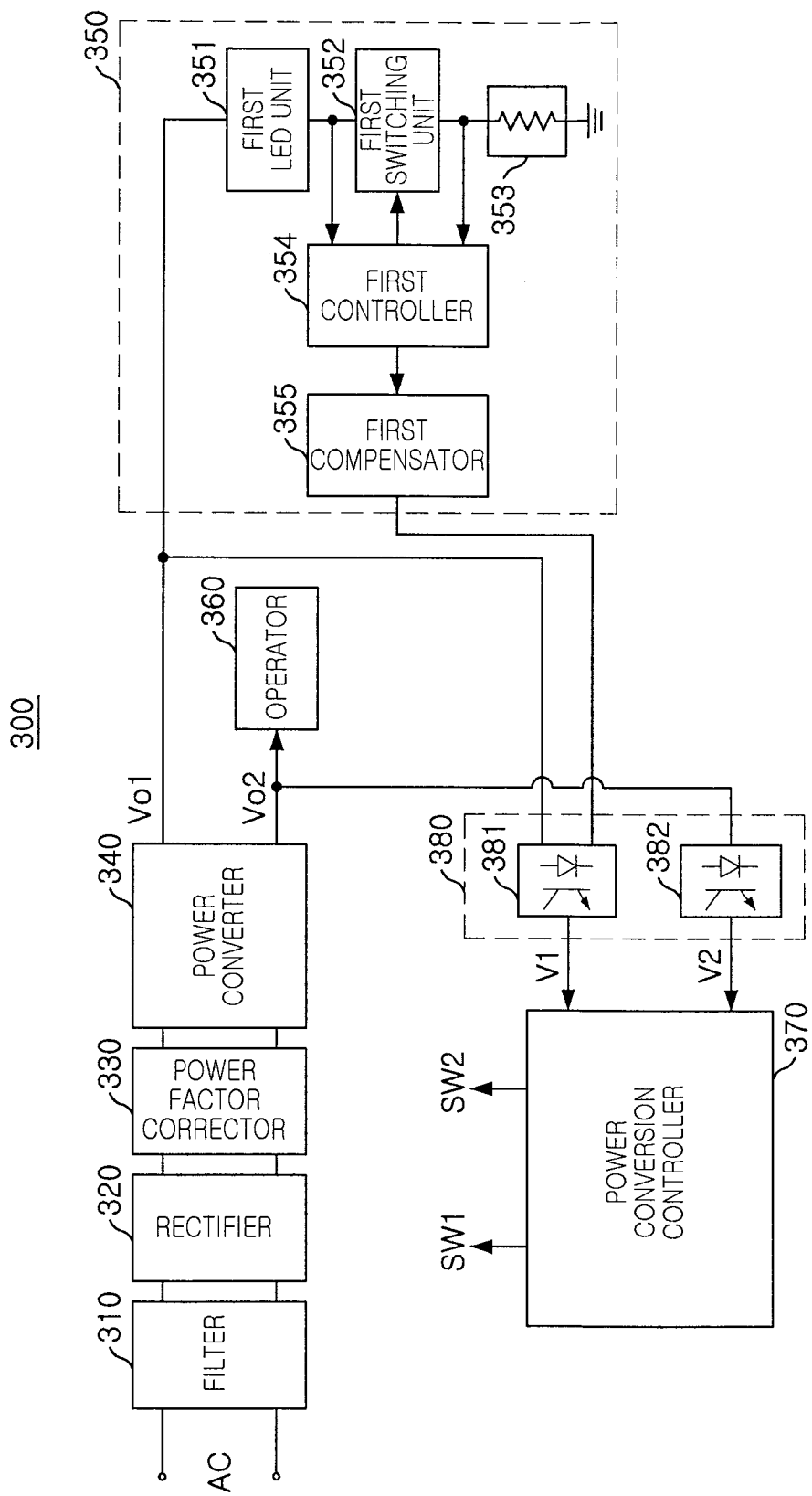
FIG. 5 is a schematic configuration diagram of a multi power supply apparatus for driving light emitting diodes according to a third embodiment of the present invention.
Figure 6:
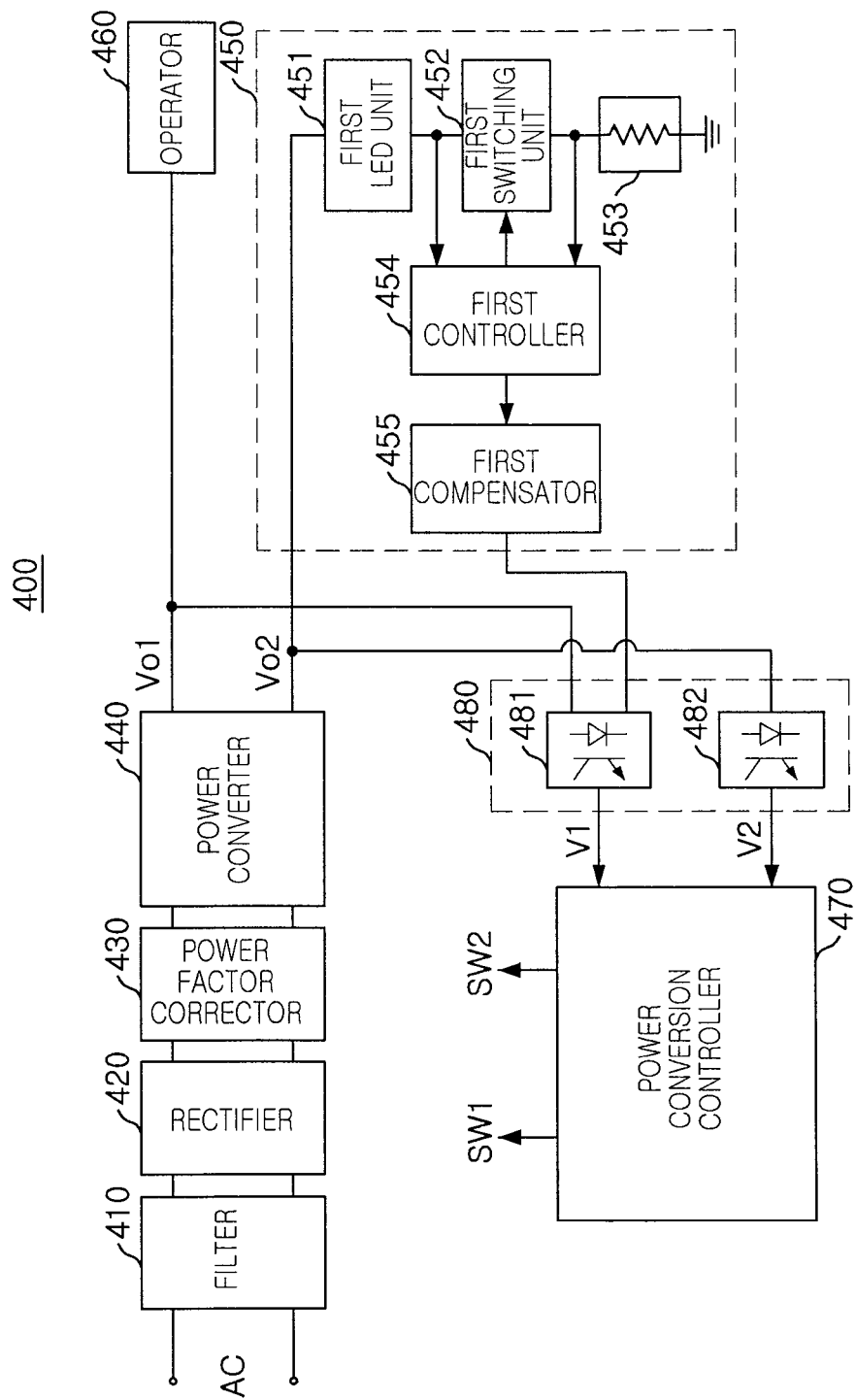
FIG. 6 is a schematic configuration diagram of a multi power supply apparatus for driving light emitting diodes according to a fourth embodiment of the present invention.

FIG. 5 is a schematic configuration diagram of a multi power supply apparatus for driving light emitting diodes according to a third embodiment of the present invention, and FIG. 6 is a schematic configuration diagram of a multi power supply apparatus for driving light emitting diodes according to a fourth embodiment of the present invention.

In a multi power supply apparatus 300 for driving light emitting diodes according to a third embodiment of the present invention, a first power Vo1 may be supplied to a first LED driver 350 and a second power Vo2 may be supplied to an operator 360 that performs a preset operation such as image driving, IC driving or the like. In this case, a power conversion controller 370 may constant-current control the first power Vo1 and constant-voltage control the second power Vo2.

In the same manner, in a multi power supply apparatus 400 for driving light emitting diodes according to a fourth embodiment of the present invention, a second power Vo2 may be supplied to a first LED driver 450 and a first power Vo1 may be supplied to an operator 460 that performs a preset operation such as image driving, IC driving or the like. In this case, a power conversion controller 470 may constant-voltage control the first power Vo1 and constant-current control the second power Vo2.

Figure 7:
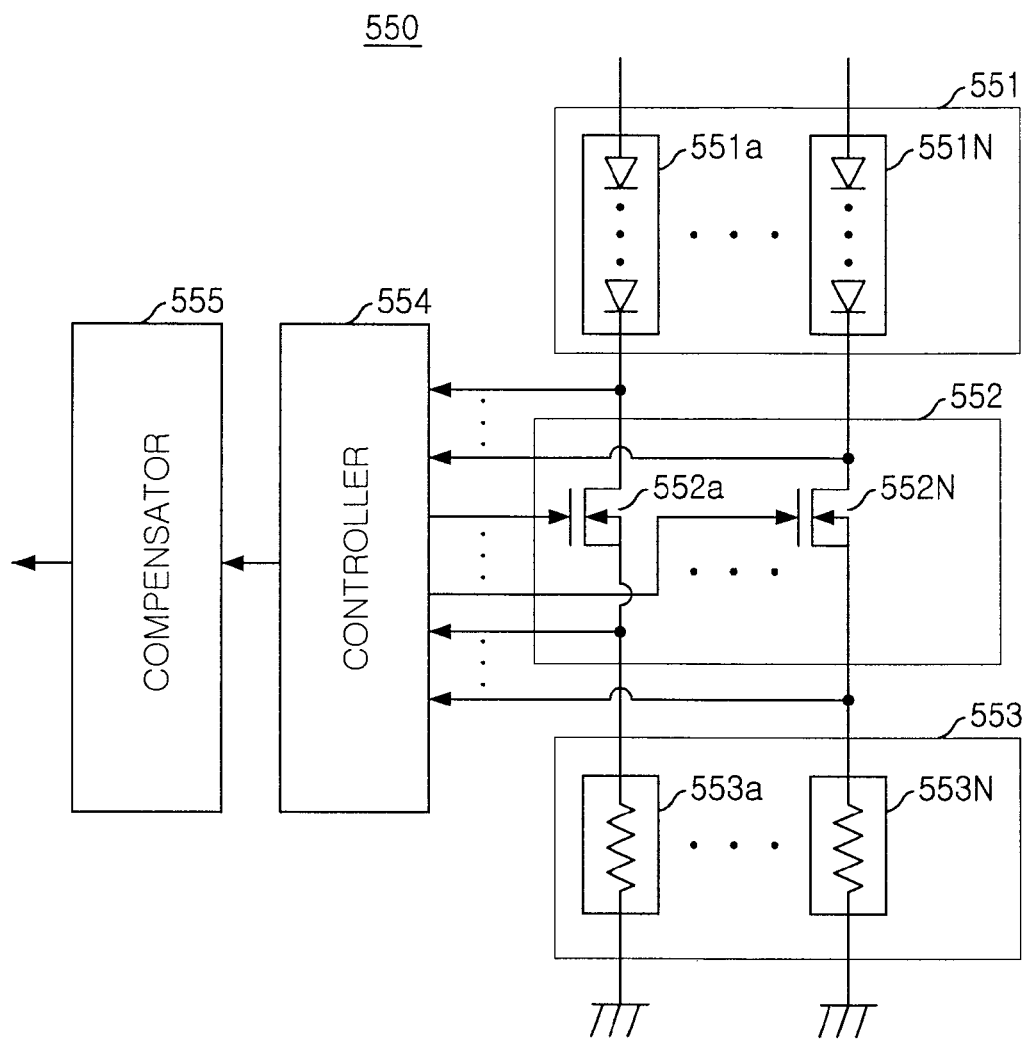
FIG. 7 is an internal configuration diagram showing an embodiment of an LED driver of a multi power supply apparatus for driving light emitting diodes according to the present invention.

FIG. 7 is an internal configuration diagram showing an embodiment of an LED driver of a multi power supply apparatus for driving light emitting diodes according to the present invention.

A LED unit 551 may include at least one light emitting diode, at least one column of light emitting diodes in which a plurality of light emitting diodes are connected in series, or a plurality of columns of light emitting diodes 551a to 551N each connected in parallel.

In this case, a switching unit 552 may include at least one switch electrically connected to the at least one light emitting diode or the at least one column of light emitting diodes of the LED unit 551 in series, or a plurality of switches 552a to 552N each electrically connected to the plurality of columns of light emitting diodes 551a to 551N of the LED unit 551 in series.

Therefore, a detection unit 553 may include at least one resistor electrically connected to the at least one switch of the switching unit 552 in series or a plurality of resistors 553a to 553N each electrically connected to the plurality of switches 552a to 552N of the switching unit 552 in series.

A controller 554 may transfer the highest one of a plurality of detected values from a detector 553 to the feedback unit through a compensator 555.

As described above, since the frequency is controlled simultaneously with controlling the power conversion at the duty synchronized therewith, the buck chopper circuit is not required, thereby making it possible to reduce the switching loss of the buck chopper circuit and the power loss due to conduction loss and reduce the manufacturing costs corresponding to the required number of components of the buck chopper circuit.

In addition, in driving the light emitting diodes, the present invention directly performs a constant current control without adopting a boost circuit, thereby making it possible to reduce the manufacturing costs corresponding to the required number of components of a boost circuit.

In addition, in the multi power supply apparatus according to the present invention, a single transformer is used as in the prior art so that a circuit area may be the same as the required number of components, and two transformers are used so that the entire power charged by the single transformer is charged by each of the two transformers, which can be miniaturized. In the same manner, the power conversion controller 170 can integrate the function as described above in a single IC, thereby not increasing the required number of components and the manufacturing costs.

As set forth above, according to exemplary embodiments of the present invention, the multi power supply apparatus for driving light emitting diodes is synchronized with a frequency of one output power of multi output power to control a switching of the multi output power and simplifies the power conversion in supplying power for driving light emitting diodes, thereby making it possible to increase power conversion efficiency and prevent the manufacturing costs from rising due to the increase in the number of components.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi power supply apparatus for driving light emitting diodes, comprising:
 a power converter converting an input power into a first power according to a preset first conversion scheme and converting the input power into a second power according to a second conversion scheme set to be different to the first conversion scheme;
 a first driver receiving the first power from the power converter to perform a preset first operation;
 a second driver receiving the second power from the power converter to perform a preset second operation;
 a feedback unit having a first feedback unit feeding back a detection signal from the first driver and a second feedback unit feeding back a detection signal from the second driver; and
 a power conversion controller controlling a power conversion switching frequency of the first power of the power converter in response to the detection signal from the feedback unit, and controlling a duty of the second power of the power converter synchronized with the power conversion switching frequency,
 the first driver being a first light emitting diode (LED) driver receiving the first power to drive LEDs.

2. The apparatus of claim 1, wherein the second driver is a second LED driver receiving the second power to drive the LEDs.

3. The apparatus of claim 2, wherein the second feedback unit is a second photo coupler that transfers a second detection signal detecting a voltage level of a current flowing through the LEDs from the second LED driver to the power conversion controller.

4. The apparatus of claim 2, wherein the second LED driver includes:
 a second LED unit receiving the second power to emit light;
 a second switching unit supplying or blocking current to the LED unit;
 a second detector detecting the current flowing through the LED unit;
 a second controller controlling a switching of the second switching unit according to the detected value of the second detector; and
 a second compensator compensating for levels of the detected results from the second controller to transfer the levels to the feedback unit,
 the second LED unit including at least one light emitting diode, at least one column of LEDs in which a plurality of LEDs are connected in series, or a plurality of columns of LEDs connected in parallel,
 the second switching unit including at least one switch electrically connected to the at least one LED or the at least one column of LEDs of the second LED unit in series, or a plurality of switches each electrically connected to the plurality of columns of LEDs of the second LED unit in series,
 the second detector including at least one resistor electrically connected to the at least one switch of the second switching unit in series or a plurality of resistors each electrically connected to the plurality of switches of the second switching unit in series, and
 the second controller transferring a detected value having a lowest level of respective detected values from the plurality of resistors of the second detector to the feedback unit.

5. The apparatus of claim 3, wherein the power conversion controller constant-current controls the first power and the second power.

6. The apparatus of claim 5, wherein the power conversion controller includes:
 a frequency controller controlling a resonant frequency according to comparison results between the voltage level of the first detection signal and the preset voltage level of a first reference voltage;
 a saw-tooth wave generator generating the saw-tooth wave according to the resonant frequency from the frequency controller;
 a duty controller comparing the error between the voltage level of the second detection signal and the preset voltage level of the second reference voltage to the saw-tooth wave from the saw-tooth wave generator, to control the switching duty of the power converter; and
 a switching controller providing first and second switching signals controlling the alternate switching of the power converter according to the switching duty control of the duty controller.

7. The apparatus of claim 6, wherein the frequency controller includes:
 a first error amplifier comparing the voltage level of the first detection signal to the preset voltage level of the first reference voltage to amplify the comparison results according to the preset amplification factor;
 a first resistor setting the amplification factor of the first error amplifier according to the preset resistance value; and
 a frequency setting device setting the resonant frequency according to the comparison results amplified by the first error amplifier.

8. The apparatus of claim 6, wherein the duty controller includes:
 a second error amplifier comparing the voltage level of the second detection signal and the preset voltage level of the second reference voltage to amplify the comparison results according to the preset amplification factor;
 a second resistor setting the amplification factor of the second error amplifier according to the preset resistance value;
 a comparator comparing the comparison results amplified by the second error amplifier and the voltage level of the saw-tooth wave from the saw-tooth wave generator; and
 a duty setting device setting the switching duty of the power converter according to the comparison results from the comparator.

9. The apparatus of claim 6, wherein the power converter includes:
 a switching unit having first and second switches alternately switched according to the control of the power conversion controller;
 a converter converting each of the powers switched from the switching unit into a power having a voltage level determined according to the preset turns ratio; and
 first and second rectifiers rectifying each of the powers converted from the converter to output the first power and the second power.

10. The apparatus of claim 9, wherein the converter is an LLC resonant converter including a resonant capacitor and a resonant inductor connected to the power input terminals of the first and second switches in series, and a magnetic inductor connected with the first and second switches in parallel.

11. The apparatus of claim 1, wherein the first feedback unit is a first photo coupler that transfers a first detection signal detecting a voltage level of a current flowing through the LEDs from the first LED driver to the power conversion controller.

12. The apparatus of claim 1, wherein the second feedback unit is a second photo coupler that transfers a second detection signal detecting a voltage level of the second power supplied to the second driver, to the power conversion controller.

13. The apparatus of claim 12, wherein the power conversion controller constant-current controls the first power and constant-voltage controls the second power.

14. The apparatus of claim 13, wherein the power conversion controller includes:
   a frequency controller controlling a resonant frequency according to comparison results between a voltage level of the first detection signal and a preset voltage level of a first reference voltage;
   a saw-tooth wave generator generating a saw-tooth wave according to the resonant frequency from the frequency controller;
   a duty controller comparing an error between a voltage level of the second detection signal and a preset voltage level of a second reference voltage to the saw-tooth wave from the saw-tooth wave generator, to control a switching duty of the power converter; and
   a switching controller providing first and second switching signals controlling an alternate switching of the power converter according to a switching duty control of the duty controller.

15. The apparatus of claim 14, wherein the frequency controller includes:
   a first error amplifier comparing the voltage level of the first detection signal to the preset voltage level of the first reference voltage to amplify the comparison results according to a preset amplification factor;
   a first resistor setting the amplification factor of the first error amplifier according to a preset resistance value; and
   a frequency setting device setting the resonant frequency according to the comparison results amplified by the first error amplifier.

16. The apparatus of claim 14, wherein the duty controller includes:
   a second error amplifier comparing the voltage level of the second detection signal and the preset voltage level of the second reference voltage to amplify the comparison results according to a preset amplification factor;
   a second resistor setting the amplification factor of the second error amplifier according to a preset resistance value;
   a comparator comparing the comparison results amplified by the second error amplifier and the voltage level of the saw-tooth wave from the saw-tooth wave generator; and
   a duty setting device setting a switching duty of the power converter according to comparison results from the comparator.

17. The apparatus of claim 14, wherein the power converter includes:
   a switching unit having first and second switches alternately switched according to the control of the power conversion controller;
   a converter converting each of the powers switched from the switching unit into a power having a voltage level determined according to a preset turns ratio; and
   first and second rectifiers rectifying each of the powers converted from the converter to output the first power and the second power.

18. The apparatus of claim 17, wherein the converter is an inductor-inductor-capacitor (LLC) resonant converter including a resonant capacitor and a resonant inductor connected to power input terminals of the first and second switches in series, and a magnetic inductor connected with the first and second switches in parallel.

19. The apparatus of claim 14, wherein the power converter includes:
   a switching unit including first and second switches alternately switched according to the control of the power conversion controller;
   first and a second converters converting each of the powers switched from the switching unit into a power having a voltage level determined according to a preset turns ratio; and
   first and second rectifiers rectifying each of the powers converted from the first and second converters to output the first power and the second power.

20. The apparatus of claim 19, wherein the first and second converters are LLC resonant converters each including a resonant capacitor and a resonant inductor connected to power input terminals of the first and second switches in series, and a magnetic inductor connected to the first and second switches in parallel.

21. The apparatus of claim 1, wherein the first LED driver includes:
   a first LED unit receiving the first power to emit light;
   a first switching unit supplying or blocking current to the LED unit;
   a first detector detecting the current flowing through the LED unit;
   a first controller controlling a switching of the first switching unit according to a detected value of the first detector; and
   a first compensator compensating for levels of detected results from the first controller to transfer the levels to the feedback unit,
   the first LED unit including at least one light emitting diode, at least one column of LEDs in which a plurality of LEDs are connected in series, or a plurality of columns of LEDs connected in parallel,
   the first switching unit including at least one switch electrically connected to the at least one light emitting diode or the at least one column of LEDs of the first LED unit in series, or a plurality of switches each electrically connected to the plurality of columns of LEDs of the first LED unit in series,
   the first detector including at least one resistor electrically connected to the at least one switch of the first switching unit in series or a plurality of resistors each electrically connected to the plurality of switches of the first switching unit in series, and
   the first controller transferring a detected value having a lowest level of respective detected values from the plurality of resistors of the first detector to the feedback unit.

22. The apparatus of claim 1, further comprising:
   a filter removing electromagnetic interference from common alternating current (AC) power;
   a rectifier rectifying power filtered by the filter; and a power factor corrector correcting a power factor of the power rectified by the rectifier to transfer the rectified power as the input power to the power converter.

23. A multi power supply apparatus for driving LEDs, comprising:
   a power converter converting an input power into a first power according to a preset first conversion scheme and converting the input power into a second power according to a second conversion scheme set to be different from the first conversion scheme;
   a first driver receiving the first power from the power converter to perform a preset first operation;
   a second driver receiving the second power from the power converter to perform a preset second operation;
   a feedback unit having a first feedback unit feeding back a detection signal from the first driver and a second feedback unit feeding back a detection signal from the second driver; and
   a power conversion controller controlling a power conversion switching frequency of the first power of the power converter in response to the detection signal from the feedback unit, and controlling a duty of the second power of the power converter synchronized with the power conversion switching frequency,
   the second driver being a second LED driver for receiving the second power to drive the LEDs.

24. The apparatus of claim 23, wherein the second feedback unit is a second photo coupler that transfers a second detection signal detecting a voltage level of a current flowing through the LEDs from the second LED driver to the power conversion controller.

25. The apparatus of claim 24, wherein the first driver is a first LED driver receiving the first power to drive the LEDs.

26. The apparatus of claim 25, wherein the first feedback unit is a first photo coupler that transfers a first detection signal detecting a voltage level of a current flowing through the LEDs from the first LED driver to the power conversion controller.

27. The apparatus of claim 25, wherein the first LED driver includes:
   a first LED unit receiving the first power to emit light;
   a first switching unit supplying or blocking current to the LED unit;
   a first detector detecting the current flowing through the LED unit;
   a first controller controlling a switching of the first switching unit according to a detected value of the first detector; and
   a first compensator compensating for levels of detected results from the first controller to transfer the levels to the feedback unit,
   the first LED unit including at least one LED, at least one column of LEDs in which a plurality of LEDs are connected in series, or a plurality of columns of LEDs connected in parallel,
   the first switching unit including at least one switch electrically connected to the at least one LED or the at least one column of LEDs of the first LED unit in series, or a plurality of switches each electrically connected to the plurality of columns of LEDs of the first LED unit in series,
   the first detector including at least one resistor electrically connected to the at least one switch of the first switching unit in series or a plurality of resistors each electrically connected to the plurality of switches of the first switching unit in series, and
   the first controller transferring a detected value having a lowest level of respective detected values from the plurality of resistors of the first detector to the feedback unit.

28. The apparatus of claim 26, wherein the power conversion controller constant-current controls the first power and the second power.

29. The apparatus of claim 28, wherein the power conversion controller includes:
   a frequency controller controlling the resonant frequency according to the comparison results between the voltage level of the first detection signal and the preset voltage level of the first reference voltage;
   a saw-tooth wave generator generating the saw-tooth wave according to the resonant frequency from the frequency controller;
   a duty controller comparing the error between the voltage level of the second detection signal and the preset voltage level of the second reference voltage to the saw-tooth wave from the saw-tooth wave generator, to control the switching duty of the power converter; and
   a switching controller providing the first and second switching signals controlling the alternate switching of the power converter according to the switching duty control of the duty controller.

30. The apparatus of claim 29, wherein the frequency controller includes:
   a first error amplifier comparing the voltage level of the first detection signal to the preset voltage level of the first reference voltage to amplify the comparison results according to the preset amplification factor;
   a first resistor setting the amplification factor of the first error amplifier according to the preset resistance value; and
   a frequency setting device setting the resonant frequency according to the comparison results amplified by the first error amplifier.

31. The apparatus of claim 29, wherein the duty controller includes:
   a second error amplifier comparing the voltage level of the second detection signal and the preset voltage level of the second reference voltage to amplify the comparison results according to the preset amplification factor;
   a second resistor setting the amplification factor of the second error amplifier according to the preset resistance value;
   a comparator comparing the comparison results amplified by the second error amplifier and the voltage level of the saw-tooth wave from the saw-tooth wave generator; and
   a duty setting device setting the switching duty of the power converter according to the comparison results from the comparator.

32. The apparatus of claim 29, wherein the power converter includes:
   a switching unit having first and second switches alternately switched according to the control of the power conversion controller;
   a converter converting each of the powers switched from the switching unit into the power having the voltage level determined according to the preset turns ratio; and
   first and second rectifiers rectifying each of the powers converted from the converter to output the first power and the second power.

33. The apparatus of claim 32, wherein the converter is an LLC resonant converter including a resonant capacitor and a resonant inductor connected to the power input terminals of the first and second switches in series, and a magnetic inductor connected with the first and second switches in parallel.

34. The apparatus of claim 23, wherein the first feedback unit is a first photo coupler that transfers a first detection signal detecting a voltage level of the first power supplied to the first driver, to the power conversion controller.

35. The apparatus of claim 34, wherein the power conversion controller constant-current controls the second power and constant-voltage controls the first power.

36. The apparatus of claim 35, wherein the power conversion controller includes:
   a frequency controller controlling a resonant frequency according to comparison results between a voltage level of the first detection signal and a preset voltage level of a first reference voltage;
   a saw-tooth wave generator generating a saw-tooth wave according to the resonant frequency from the frequency controller;
   a duty controller comparing an error between a voltage level of the second detection signal and a preset voltage level of a second reference voltage to the saw-tooth wave from the saw-tooth wave generator, to control a switching duty of the power converter; and
   a switching controller providing first and second switching signals controlling an alternate switching of the power converter according to a switching duty control of the duty controller.

37. The apparatus of claim 36, wherein the frequency controller includes:
   a first error amplifier comparing the voltage level of the first detection signal to the preset voltage level of the first reference voltage to amplify the comparison results according to a preset amplification factor;
   a first resistor setting the amplification factor of the first error amplifier according to a preset resistance value; and
   a frequency setting device setting the resonant frequency according to the comparison results amplified by the first error amplifier.

38. The apparatus of claim 36, wherein the duty controller includes:
   a second error amplifier comparing the voltage level of the second detection signal and the preset voltage level of the second reference voltage to amplify the comparison results according to a preset amplification factor;
   a second resistor setting the amplification factor of the second error amplifier according to a preset resistance value;
   a comparator comparing the comparison results amplified by the second error amplifier and the voltage level of the saw-tooth wave from the saw-tooth wave generator; and
   a duty setting device setting a switching duty of the power converter according to comparison results from the comparator.

39. The apparatus of claim 36, wherein the power converter includes:
   a switching unit having first and second switches alternately switched according to the control of the power conversion controller;
   a converter converting each of the powers switched from the switching unit into a power having a voltage level determined according to a preset turns ratio; and
   first and second rectifiers rectifying each of the powers converted from the converter to output the first power and the second power.

40. The apparatus of claim 39, wherein the converter is an LLC resonant converter including a resonant capacitor and a resonant inductor connected to power input terminals of the first and second switches in series, and a magnetic inductor connected with the first and second switches in parallel.

41. The apparatus of claim 36, wherein the power converter includes:
   a switching unit including first and second switches alternately switched according to the control of the power conversion controller;
   first and a second converters converting each of the powers switched from the switching unit into a power having a voltage level determined according to a preset turns ratio; and
   first and second rectifiers rectifying each of the powers converted from the first and second converters to output the first power and the second power.

42. The apparatus of claim 41, wherein the first and second converters are LLC resonant converters each including a resonant capacitor and a resonant inductor connected to power input terminals of the first and second switches in series, and a magnetic inductor connected to the first and second switches in parallel.

43. The apparatus of claim 23, wherein the second LED driver includes:
   a second LED unit receiving the second power to emit light;
   a second switching unit supplying or blocking current to the LED unit;
   a second detector detecting the current flowing through the LED unit;
   a second controller controlling a switching of the second switching unit according to a detected value of the second detector; and
   a second compensator compensating for levels of detected results from the second controller to transfer the levels to the feedback unit,
   the second LED unit including at least one LED, at least one column of LEDs in which a plurality of LEDs are connected in series, or a plurality of columns of LEDs connected in parallel,
   the second switching unit including at least one switch electrically connected to the at least one LED or the at least one column of LEDs of the second LED unit in series, or a plurality of switches each electrically connected to the plurality of columns of LEDs of the second LED unit in series,
   the second detector including at least one resistor electrically connected to the at least one switch of the second switching unit in series or a plurality of resistors each electrically connected to the plurality of switches of the second switching unit in series, and
   the second controller transferring a detected value having a lowest level of respective detected values from the plurality of resistors of the second detector to the feedback unit.

44. The apparatus of claim 23, further comprising:
   a filter removing electromagnetic interference from common AC power;
   a rectifier rectifying power filtered by the filter; and
   a power factor corrector correcting a power factor of the power rectified by the rectifier to transfer the rectified power as the input power to the power converter.

* * * * *